United States Patent [19]
Conticello

[11] Patent Number: 5,831,639
[45] Date of Patent: Nov. 3, 1998

[54] SCANNING DISPLAY DRIVER

[75] Inventor: Thomas Conticello, Kings Park, N.Y.

[73] Assignee: Symantec Corporation, Cupertino, Calif.

[21] Appl. No.: 498,787

[22] Filed: Jul. 5, 1995

[51] Int. Cl.[6] ....................................................... G09G 5/00
[52] U.S. Cl. ................................ 345/511; 345/2; 345/508
[58] Field of Search ............................... 345/1, 2, 3, 508, 345/511

[56] References Cited

U.S. PATENT DOCUMENTS

| | | | |
|---|---|---|---|
| 5,136,695 | 8/1992 | Goldshlag et al. | 345/2 |
| 5,341,379 | 8/1994 | Crisp | 371/6 |
| 5,488,702 | 1/1996 | Byers et al. | 395/186 |

Primary Examiner—Richard A. Hjerpe
Assistant Examiner—Kent Chang
Attorney, Agent, or Firm—Fenwick & West LLP

[57] ABSTRACT

A remote control program (230) includes a scanning display driver (232) that interacts with the graphics display driver (112) of a host computer (110) to provide to the display (122) of the remote computer (120) an image (117) generated on the display (116) of the host computer (110). The scanning display driver (232) employs device independent function calls to the GDI (112) of the host computer (110) to eliminate any hardware dependent artifacts from the remote computer display (122). A scanning module (234) in the scanning display driver (112) retrieves bit map segments (119) of the image (117) on the host display (116), calculates a checksum value for comparison with a stored checksum value (542), updates the stored value (542) when the bit map segment (119) has been changed, and sets a flag (544) to indicate a new checksum value has been stored. An update module (236) scans the flags (544) and operates in conjunction with a communication module (240) to transfer changed bit map segments (119) to the remote computer (120). Transferred bit map segments (129) are stored in the remote computer (120) and used to refresh the image (127) on the remote display (122) until a new checksum value indicates that the bit map segment (119) on the host display (116) has been changed.

12 Claims, 7 Drawing Sheets

SCANNING DISPLAY DRIVER

BACKGROUND OF THE INVENTION

1. Technical Field

This invention relates to the field of computers and in particular to the field of remote control systems for accessing information on a host computer using a computer at a remote location.

2. Background Art

Portable computers have made it possible for people to work away from their offices with greater ease. However, portable computers are designed with limited memory resources in order to maintain their portability. Consequently, a person working away from the office does not always have access to the full data resources available on the office computer network. Even where a person has access to remote computers with substantial memory capacities, it is both impractical and unsafe to maintain copies of company documents at all the remote locations at which an employee may work. One solution to this problem has been the development of remote control programs that allow a person to access and control a host computer through a remote computer. A person using a remote control program can access and work with documents stored on the host computer as if the documents were stored on the remote computer.

Ideally, remote control programs allow the user to communicate with the host processor through the remote computer as if the user were communicating directly with the host computer. In practice, this means that the remote control program must replicate at the video display of the remote computer the graphical user interface (GUI) of the host computer. Conventional remote control programs do this by intercepting function calls between the host computer's operating system and display driver and reformatting the function calls, including any accompanying data structures, for the display driver in the remote control program.

A graphics interface module in the operating system is typically responsible for generating display related function calls. Such interface modules are referred to by various names, including for example, graphics driver interfaces (GDI), and are supported in most modern operating systems. The GDI is designed to isolate application software from display hardware by accepting generic (hardware-independent) function calls made by application programs and reformatting them as hardware-dependent calls suitable for the display hardware of the computer. Conventional remote control programs by-pass this isolating feature of GDIs by inserting a software layer between the host GDI and host display driver to trap function calls from the host GDI to the host display driver. The inserted software layer reformats these function calls for a display driver in the remote control program and chains the original function calls to the host display driver.

The methods employed in conventional remote control systems double the amount of host computer memory devoted to display driver resources, since the host computer memory must accommodate both the remote control display driver and the host display driver. In addition, while data structures passed to the host display driver are nominally standardized, the original equipment manufacturers (OEMs) that manufacture display drivers do not always adhere to the published standards. Consequently, assumptions made about the data structures passed by the GDI to the host display driver are not always correct. Further, this method implements every function call from the GDI to the host display driver, whether or not it leads to a change in the image displayed on the host computer. Variations on this method use an inserted software layer to hook those function calls from the host display driver that control the image on the host display. However, this approach still by-passes the GDI and makes similar assumptions about data structures generated by the GDI.

There is thus a need for a remote control program that provides device independent video reproduction with a minimum impact on the host computer system.

SUMMARY OF THE INVENTION

The present invention is a system and method for generating at a remote computer (120) the image (117) produced on a host computer display (116) which has been accessed by the remote computer (120) through a remote control program (230). The remote control program (230) of the present invention includes a scanning display driver (232), which uses the GDI (112) and display driver (114) of the host computer (110) to generate and retrieve the device-independent bit map segments (119) that make up the image (117) on the host display (116). The scanning display driver (230) tests these bit map segments (119) for any changes and transmits changed segments to the remote computer (120) to update the image (123) on the remote display (122).

In order to implement the method of the present invention, the scanning display driver (232) includes a scanning module (234) and an update module (236). The scanning module (234) employs device independent calls to the GDI (112) to retrieve the device independent bit map segments (119) that make up the image (117) on the host display (116). The scanning module (234) then calculates a status characteristic for each retrieved segment (119) and retrieves a status characteristic previously calculated for the segment (119) and stored in a memory location (238) shared with the update module (236). The scanning module (234) compares the current and previously calculated status characteristics and, if they differ, the scanning module (234) stores the current status characteristic in the shared memory location (238) and sets an update flag (544) associated with the stored status characteristic. The update module (236) scans the shared memory location (238) and identifies bit map segments (119) having set update flags (540) to a communication module (240), which transfers the bit map segment (19) to the remote computer (120).

DETAILED DESCRIPTION OF THE PREFERRED EMBODIMENTS

Figure 1:
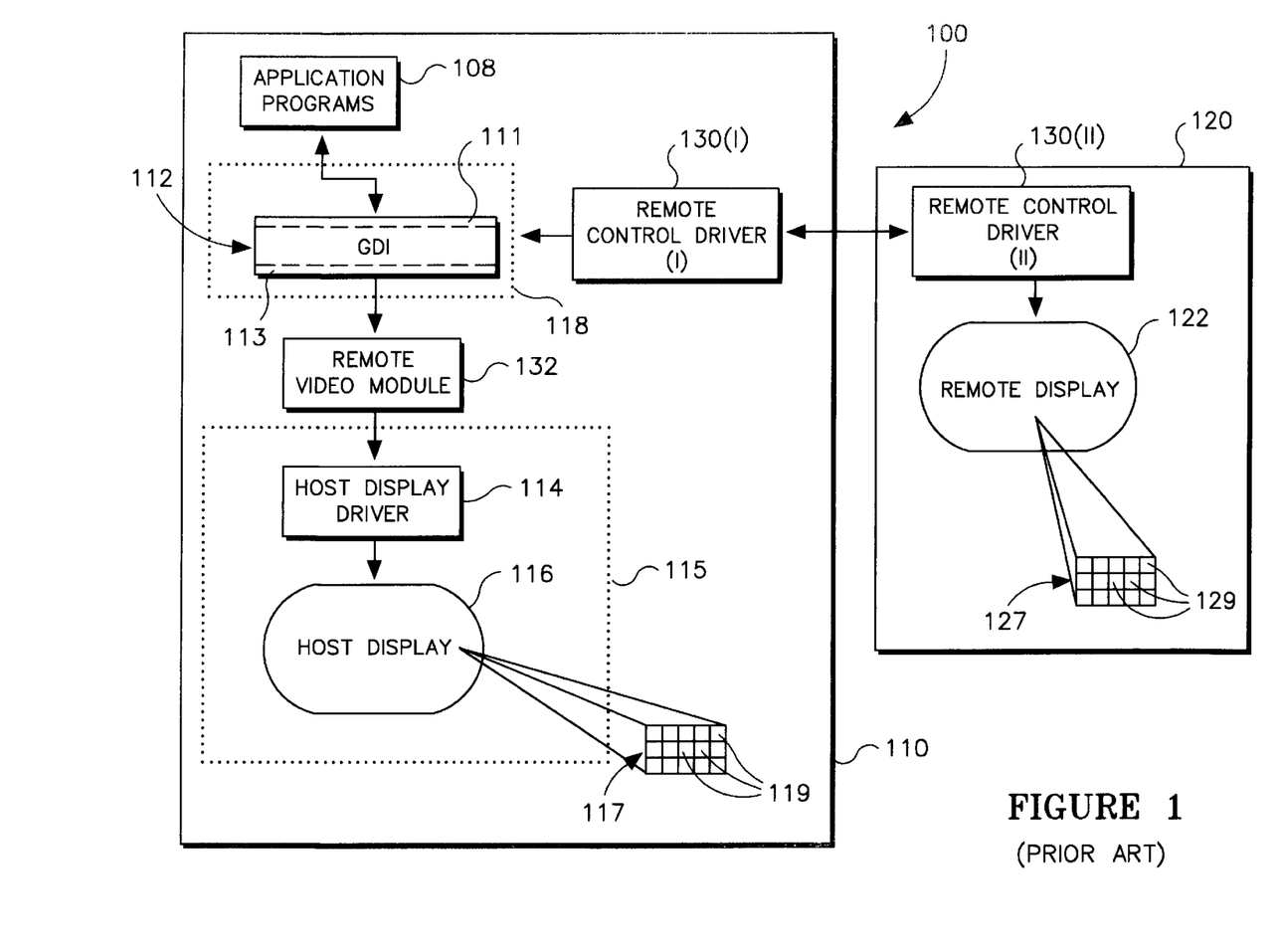
FIG. 1 is a block diagram of a conventional remote control program (130) as implemented in host and remote computers (110, 120).

Referring to FIG. 1, there is shown a block diagram of a conventional remote control system 100 for communicating between a host computer 110 and a remote computer 120. FIG. 1 shows only those parts of an operating system 118 of host computer 110 that are relevant to the present invention. In particular, a graphics driver interface (GDI) 112 of operating system 118 serves as an interface to a hardware layer 115 that includes host display driver 114 and host display 116. GDI 112 translates commands from other modules in host operating system 118, applications programs 108, and communications programs such as remote control program 130 into images 117 on host display 116 using host display driver 114.

GDI 112 is designed to isolate applications programs 108 and communications programs 130 from hardware layer 115 by providing hardware independent entry points into hardware layer 115 for programs 108. This is indicated by including in GDI 112 a hardware independent interface 111 through which application programs 108 communicate with GDI 112 using generic or hardware-independent commands. GDI 112 handles the reformatting and translation necessary to deal with the specific hardware (host display driver 114 and display 116). The resulting hardware-dependent signals are indicated in the figure as being provided through a hardware dependent interface 113.

Remote control program 130 is indicated in FIG. 1 as comprising a host component 130(I) resident in host computer 110 and a remote component 130(II) resident in remote computer 120. Host and remote components 130(I), 130(II) include similar modules for coupling data between the computer in which each component is resident and the other component of remote control program 130. Except where reference to a specific component 130(I), 130(II) is required, remote control program 130 is identified without an index (I, II) in the following discussion.

As can be seen from FIG. 1, conventional remote control programs 130 by-pass GDI 112 by inserting a remote video module 132 between hardware layer 115 and hardware interface 113. Thus, all communications between GDI 112 and host display driver 114 are coupled through remote video module 132 in conventional remote control driver 130. This configuration allows remote video module 132 to intercept video-image-generating function calls from GDI 112 to display driver 114 and translate these function calls and any accompanying data structures into a format suitable for a display driver (not shown). The display driver is typically included in host component 130(I) remote control program 130(I) to minimize the amount of data transmitted to remote computer 120.

The major drawback of conventionally configured remote control program 130 is that remote video module 132 interacts directly with hardware-dependent interface 113 and hardware layer 115. As a result, designers of remote video module 132 must make certain assumptions about the format of hardware-dependent data structures passed from GDI 112 to host display driver 114. As noted above, these data structures are often different from the published standards, with the differences depending on which OEM provides the hardware, i.e. host display driver 114. Further, remote video module 132 is loaded when host computer 110 is booted, forcing all transactions between GDI 112 and host display driver 114 to traverse an additional layer of software, whether or not remote control program 130 is in use. This can reduce the performance of the video subsystem formed by GDI 112, host display driver 114, and host display 1 16.

As indicated above, some remote video modules 132 are designed to hook functions from host display driver 114 to minimize their impact on communications between GDI 112 and display driver 114. However, this approach still forces remote control program 130 to by-pass GDI 112 and requires designers to assume formats for the necessary data structures.

Figure 2:
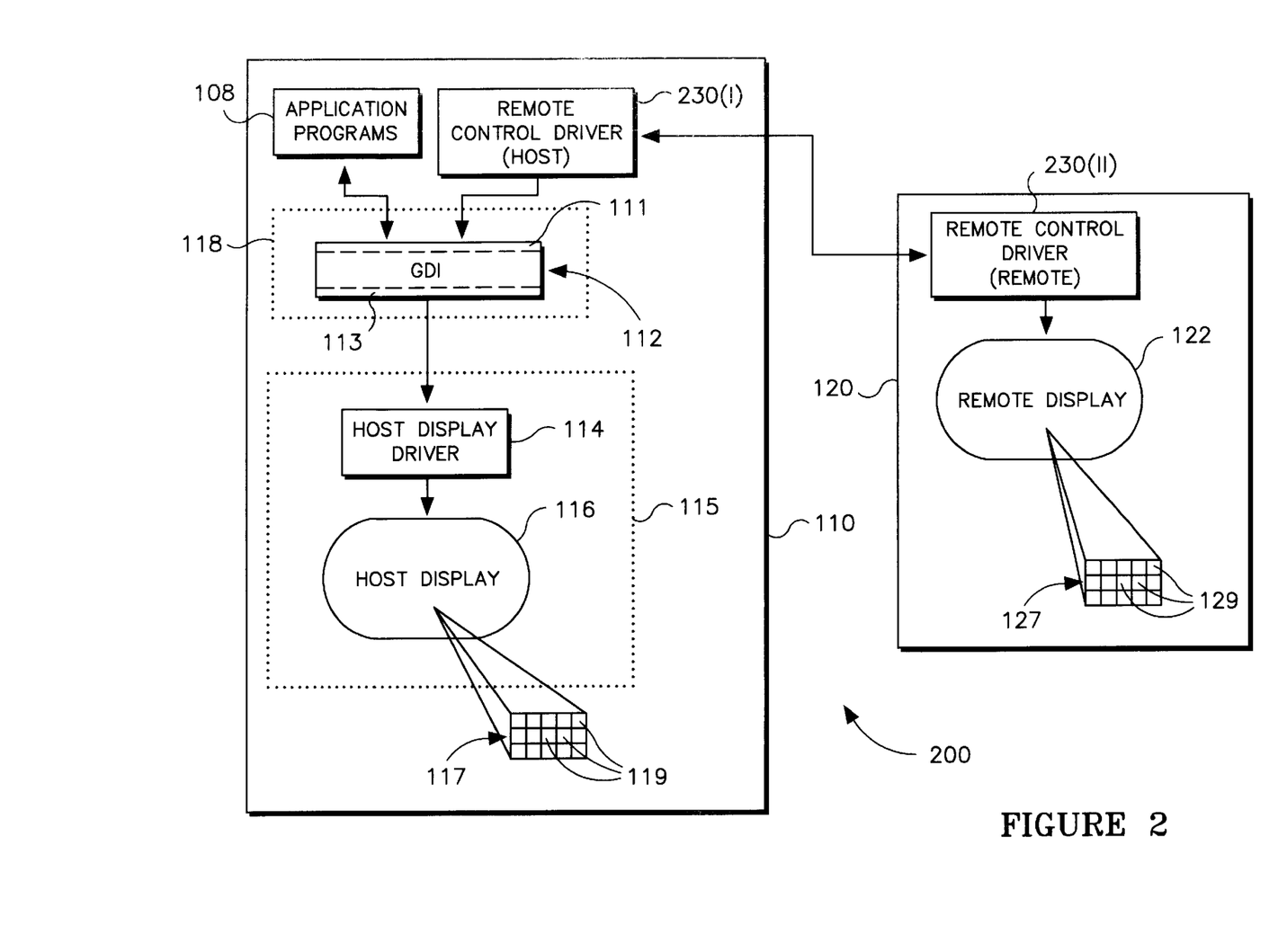
FIG. 2 is a block diagram showing the configuration of a remote control program (230) in accordance with the present invention relative to the GDI (112) of the host computer (110).

Referring now to FIG. 2, there is shown a block diagram of a remote control system 200 in accordance with the present invention. Common reference numbers are used to identify elements that are unchanged between FIGS. 1 and 2. As can be seen from FIG. 2, a remote control program 230 in accordance with the present invention is coupled to GDI 112 through hardware-independent interface 111, eliminating hardware dependent artifacts from the operation of remote control system 200. This configuration also eliminates any degradation to the performance of host computer 110 attributable to the insertion of remote video module 132 between GDI 112 and host display driver 114, as occurs in conventional remote control programs 130.

Figure 3:
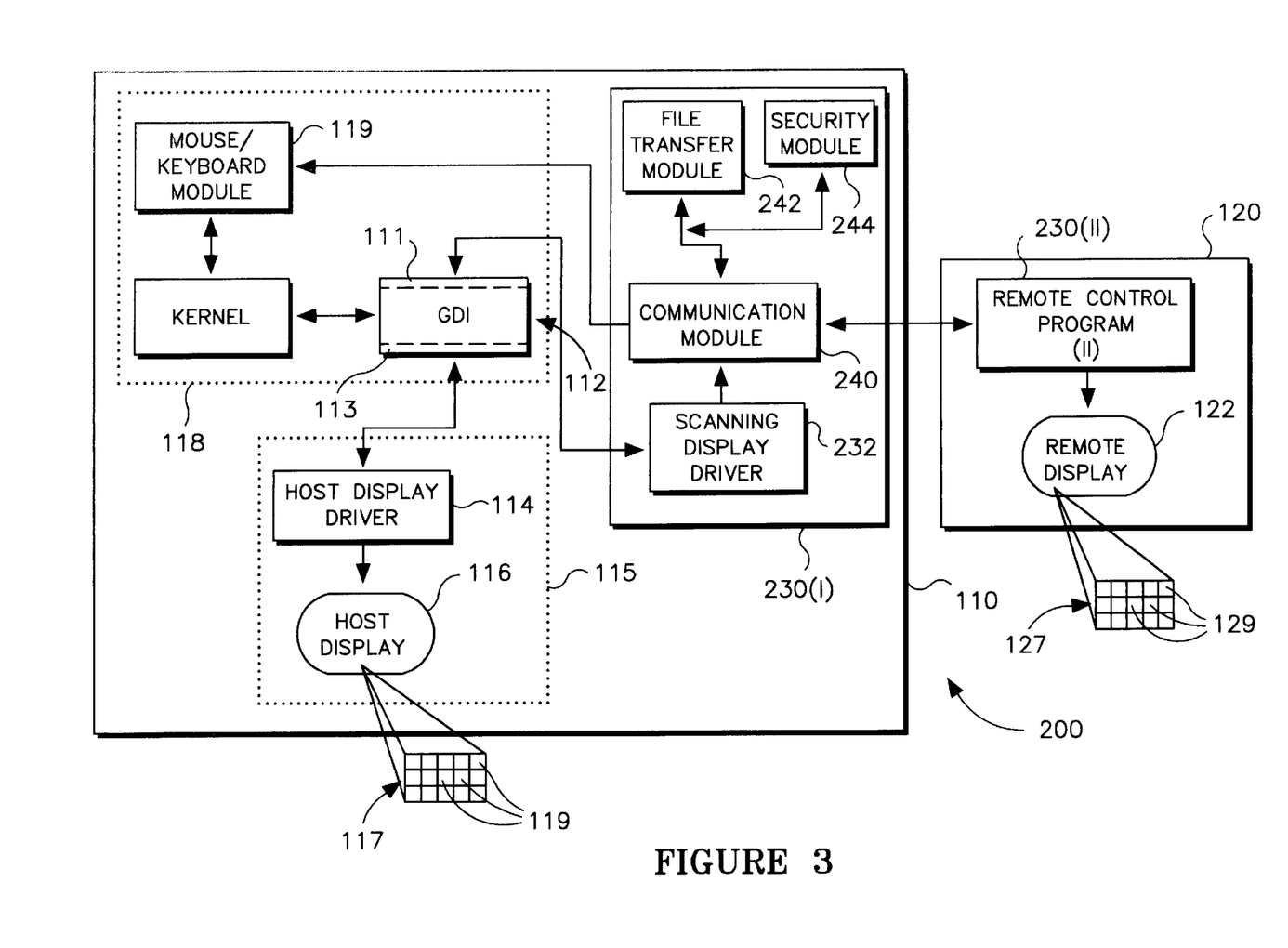
FIG. 3 is a block diagram of selected elements of the remote control program (230) of FIG. 2, along with elements of the host operating system (118).

Referring now to FIG. 3, there is shown a more detailed block diagram of remote control program 230 in accordance with the present invention, along with the relevant elements of operating system 118 of host computer 110. Remote control program 230 comprises a scanning display driver 232, a communication module 240, a file transfer module 242, and a security module 244. Communication module 240 transfers commands from remote computer 120 to mouse/keyboard module 119 of host operating system 118. Communication module 240 also transfers video images provided by scanning display driver 232 to remote computer 120, and, in conjunction with file transfer module 242, communication module 240 handles file transfers between host and remote computers 110, 120, respectively. Security module 244 controls access through remote control program 230 to various resources in host computer 110.

Remote control program 230 is coupled directly to hardware independent interface 111 of GDI 112 through scanning display driver 232. This allows scanning display driver 232 to retrieve bit map segments 119 generated by the video hardware (host display driver 114 and host display 116) of host computer 110 through hardware-independent function calls to GDI 112. For example, GDIs 112 of the Windows™ operating systems include a function, GetDIBit( ), i.e. get device-independent bit map. GetDIBit( ) is used by various modules in operating system 118 and application programs 108 to retrieve bit map segments 119 at display coordinates specified in the function call in order to format and manipulate graphics files. In the present invention, remote control program 230 uses GetDIBit( ) to retrieve bit map segments 119 for analysis and processing as described below. Thus, unlike conventional remote control systems 100 of FIG. 1, no module of remote control program 230 intervenes between hardware-dependent interface 113 of GDI 112 and host device driver 114.

Remote control program 230 functions with operating systems 118 that support either single or multi-threaded processes. However, when operating system 118 supports only single threaded processes, updating of remote display 122 by remote control program 230 is slower since a process switch is required to implement different threads of scanning display module 232. On the other hand, multi-threaded operating systems, such as Windows 95™, Windows NT™, OS/2™, and UniX™, allow different threads of scanning display driver 232 to be active concurrently. Thus, as one thread scans bit map segments 119 of host display 116, a second thread is ready to transfer any altered bit map segments 119 without going through a process switch. This is discussed in greater detail below in conjunction with the structure of scanning display driver 232.

Figure 4:
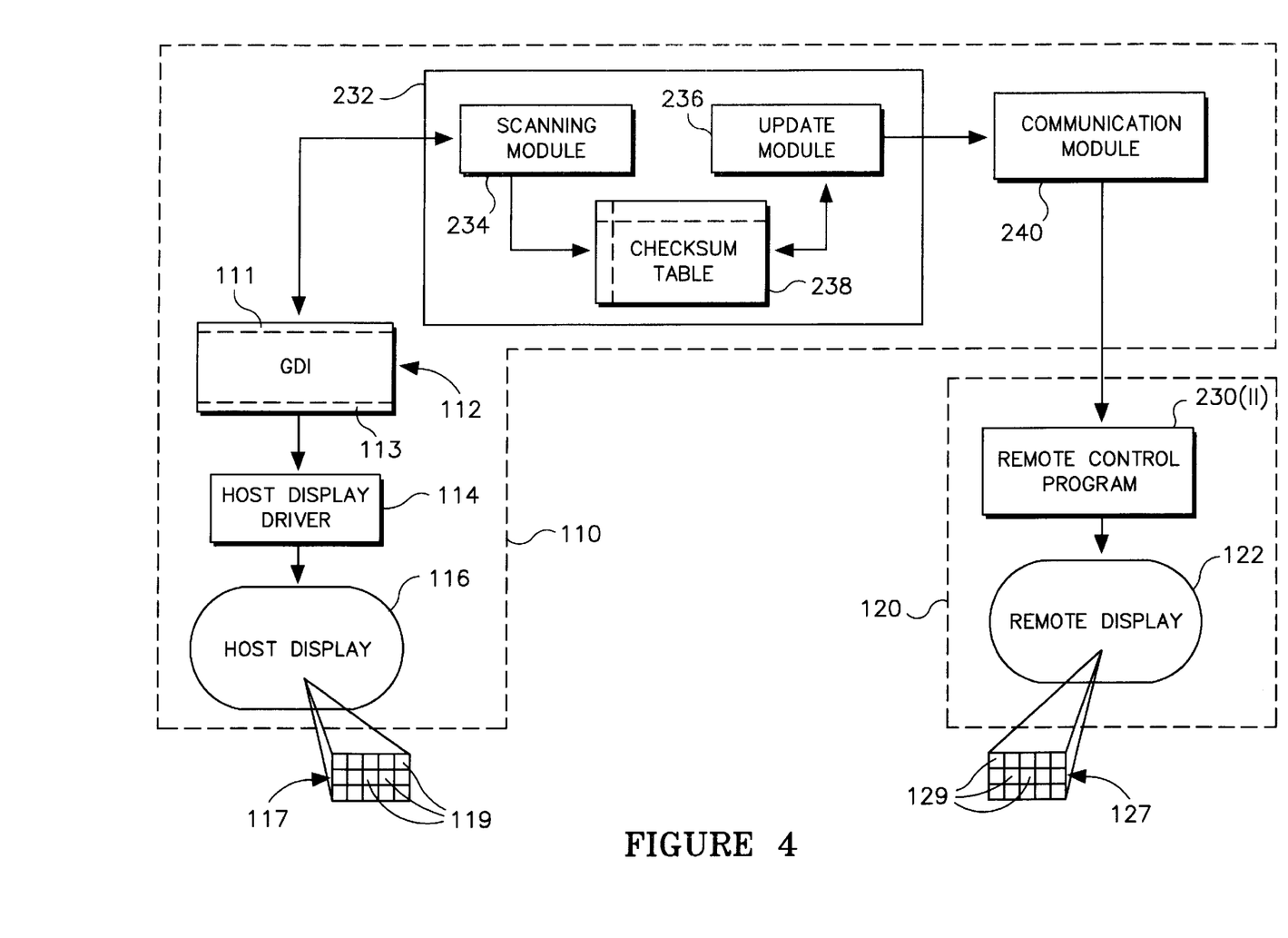
FIG. 4 is a block diagram showing the scanning and update modules (234, 236) and shared memory location (238) of the scanning display driver (232) along with their connections to the elements of the host and remote computer systems (110, 120).

Referring now to FIG. 4, there is shown a schematic representation of scanning display driver 232, including a scanning module 234 and an update module 236. Also indicated is a shared memory location 238 which is generated by scanning display driver 232 in order to track the status of various bit map segments 119 which make up image 117 on host display 116. As indicated in the figure, scanning module 234 and update module 236 exchange information through shared memory location 238. In the disclosed embodiment, shared memory location 238 is a table, the structure of which is described in greater detail below.

When scanning display driver 232 is activated, scanning module 234 implements a scanning thread that analyzes each bit map segment 119 of image 117. Bit map segments 119 are identified in units known as cells. For each cell, scanning module 234 calls a function in GDI 112 (GetDIBit( ) in the case of Windows™ operating systems) to retrieve corresponding bit map segment 119 for analysis.

Scanning module 234 analyzes retrieved bit map segment 119 to determine whether the corresponding cell of image 117 has been changed. In the preferred embodiment, scanning module 232 implements a cyclic redundancy check (CRC) algorithm which characterizes the status of a cell. In particular, the CRC algorithm calculates a checksum value for each cell that indicates whether any bits that make up the cell have changed. Scanning module 234 then reads from table 238 a checksum value previously calculated for the cell and compares it with the checksum value just calculated. If the just-calculated checksum value of a cell differs from the value stored in table 238, scanning module 234 writes the just-calculated checksum value to table 238 and sets an associated flag to indicate the value is new. If the current and previous checksum values are the same, scanning module 234 moves to the next cell of host display 116.

Figure 5:
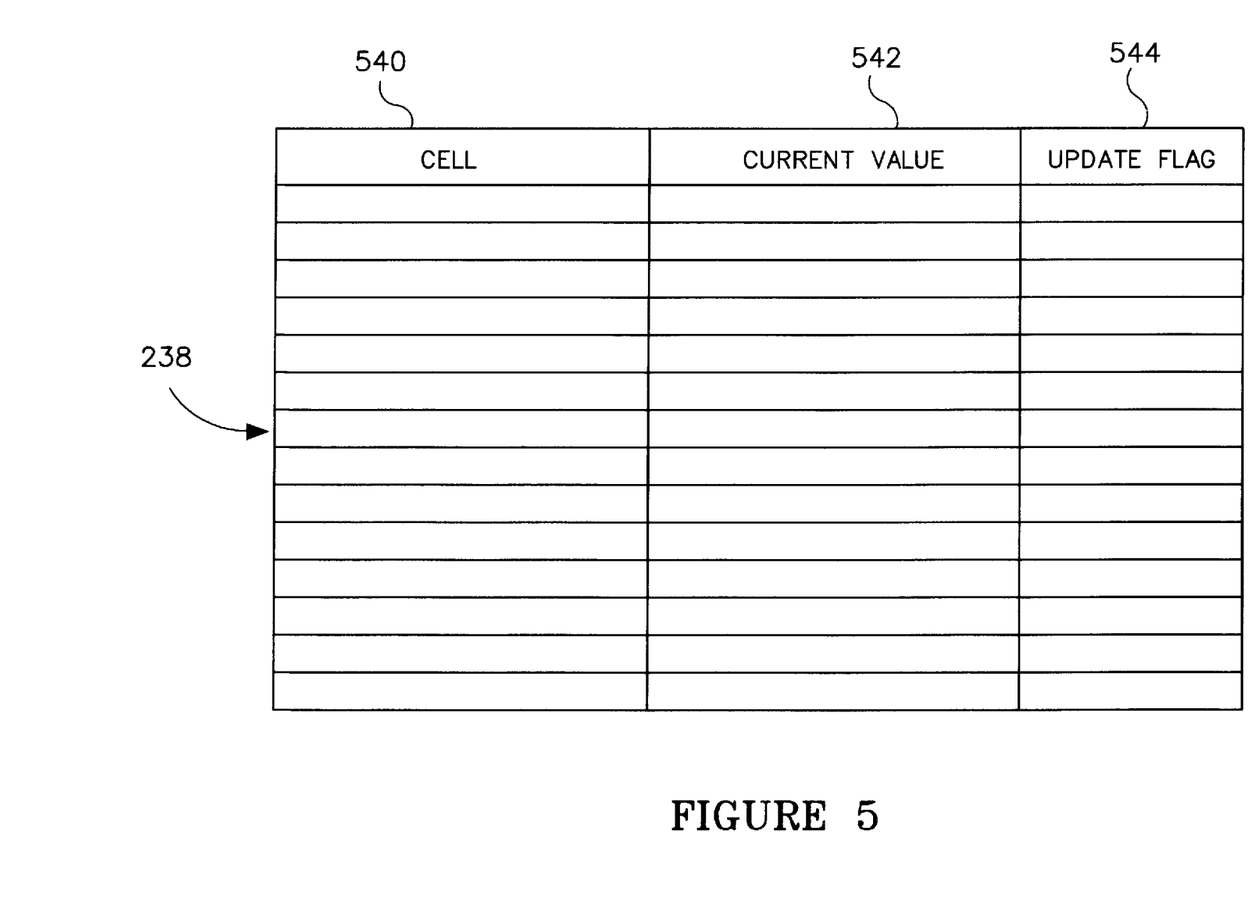
FIG. 5 is a schematic representation of the shared memory location (238) of FIG. 4.

Referring now to FIG. 5, there is shown a schematic representation of one implementation of table 238 suitable for use in scanning display driver 232. Table 238 comprises a cell identifier 540, a current value 542, and an update flag 544 for each cell of image 117. Cell identifier 540 is used to index current value 542 and update flag 544, and may include, for example, a pointer to the memory location in which bit map segment 119 of a cell is stored. Current value 542 includes the checksum value calculated for the cell the last time its corresponding bit map segment 119 changed, and update flag 544 includes a bit that is set by scanning module 234 whenever current value 542 is updated with a new value.

Update module 236 implements a thread that accesses data in table 238 to determine which cells of image 117 on host display 116 should be forwarded to remote computer 120 to refresh remote display 122. In the disclosed embodiment, update module 236 scans table 238 to identify cells for which update flags 544 have been set by scanning module 234. For each cell having update flag 544 set, update module 236 invokes communication module 240 with cell identifier 540 to retrieve corresponding bit map segment 119 and send it to remote display 122. In a multi-threaded operating system 118, the threads of scanning and update modules 234, 236 can be active concurrently, and there is no need for operating system 118 to implement a process switch each time update module 236 or scanning module 234 performs its function.

Figure 6A:
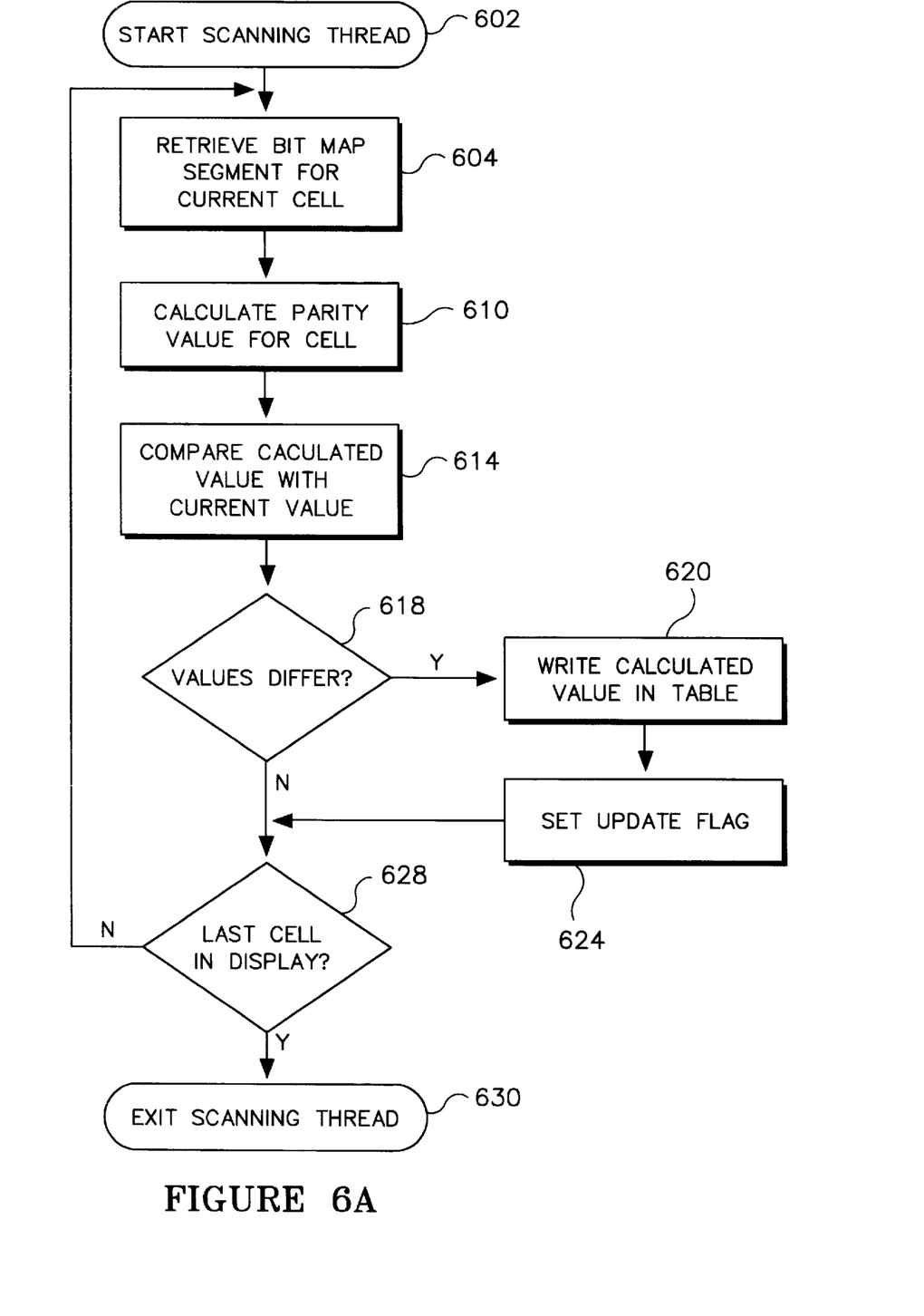
FIG. 6A and FIG. 6B are flow charts representing the methods implemented by the scanning and update modules (234, 236) of FIG. 4.

Referring now to FIG. 6A, there is shown a flow chart summarizing the scanning thread implemented by scanning module 234. When the scanning thread is started 602, scanning module 234 retrieves 604 a device-independent bit map 119 for a cell of image 117, using GDI 112. A checksum value is calculated 610 from retrieved bit map segment 119 and compared 614 with the checksum value of the cell in table 238. If the calculated value differs 618 from the current value, scanning module 234 writes 620 the newly calculated checksum value to table 238, sets 624 update flag 244, and checks 628 whether all cells of image 117 have been analyzed. If not, the thread returns to step 604 and repeats the analysis on the next cell. If the last cell has been analyzed, the scanning thread is exited 630.

Figure 6B:
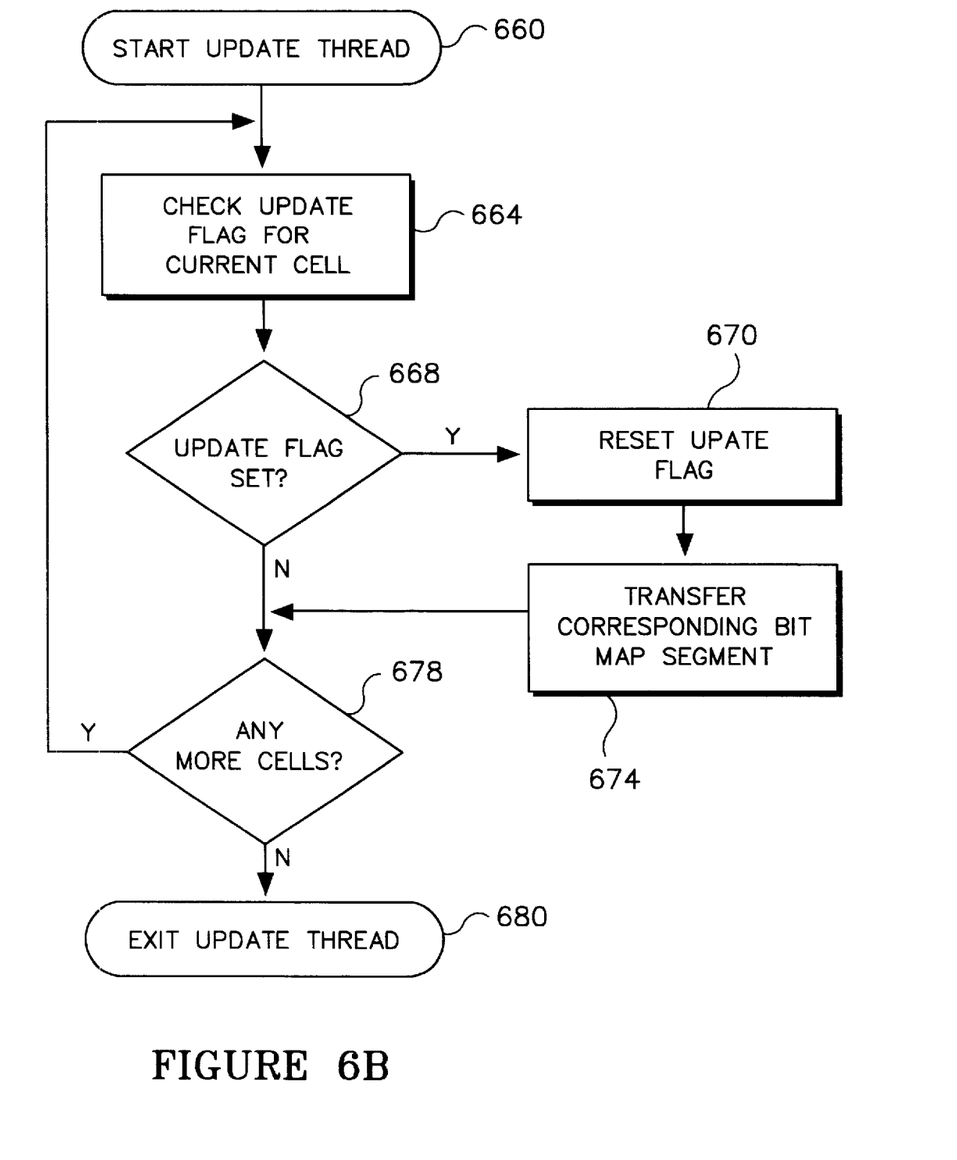

Referring now to FIG. 6B, there is shown a flow chart of the thread implemented by update module 236 when it is started 660. For each cell, update module 236 checks 664 update flag 544 to determine whether bit map segment 1119 of the corresponding cell has changed. When a set update flag 544 is identified 668, update module 236 resets 670 update flag 544 and invokes communication module 240 with cell identifier 540 to transfer 674 bit map segment 119 to remote display 122. Update module 236 then determines 678 whether any more cells are left for analysis. If more cells remain, the thread returns to step 664 and update flag 540 for the next cell is checked. If all cells have been analyzed, the update thread is exited 680.

Transferred bit map segments are used to update remote display 122, and in the preferred embodiment of the invention, the transferred bit map segments are saved in a memory associated with remote computer 120 to eliminate the need for retransmitting unchanged bit map segments 119 on subsequent refresh cycles for remote display 122.

Pseudocode representations of the threads implemented by scanning and update modules 234, 236 are shown in Table 1.

TABLE 1

```
ScreenCheckThread( )
{
    For each cell 119 on display 116
    {
        Calculate Checksum of bits in cell 119
        If Checksum does not match the previous Checksum
        for the same cell 119
        {
            Update the saved Checksum
            Mark the region as needing updating
        }
    }
}
ScreenUpdateThread( )
{
    For each cell 119 on display 116
    {
        If the cell 119 is marked as needing updating
        {
            If the viewer does not already have the cell 119
            {
                Send the cell 119 to the viewer
                Save the region for possible repeating
            }
            Clear the needs updating flag 544
        }
    }
}
```

There has thus been disclosed a remote control system 230 and method for displaying on a remote computer display 122 the images 117 generated on a host computer 110. The system includes a scanning display driver 232 that interacts with the graphics display driver 112 of the host computer 110 through a hardware independent interface 111. Consequently, the scanning display driver 232 does not interfere with the video subsystem 115 of the host computer 110, since it does not have to trap function calls from the GDI 112 to the display hardware layer 115 and reformat the trapped function calls for a driver in the remote system. Further, the scanning display driver 232 does not require as much memory, since it is not necessary to include a separate display driver module in the remote control program 230.

I claim:

1. A computer implemented method for generating on a display of a remote computer a video image produced on a display of a host computer, the host computer being accessed by the remote computer through a remote control program, the host computer including a graphics driver interface (GDI) for converting device-independent function calls into device-dependent function calls suitable for the display hardware of the host computer the method comprising the steps of:

retrieving a device-independent bit map segment from the GDI of the host computer responsive to a device-independent function call;

calculating a current status characteristic of the retrieved bit map segment;

comparing the current status characteristic with a stored status characteristic of the retrieved bit map segment; and transferring the retrieved bit map segment to the remote computer when the current status characteristic and the stored status characteristic of the bit map segment are unequal.

2. The method of claim 1, further comprising the step of saving the current status characteristic of the bit map segment when the current and previous characteristics are unequal.

3. The method of claim 1, wherein the step of retrieving the device-independent bit map segment comprises:

determining a set of coordinates for a bit map segment; and calling a device-independent function in the GDI for retrieving the device independent bit map segment with the determined coordinates.

4. The method of claim 1, wherein the step of calculating a status characteristic of the retrieved bit map segment comprises using a cyclic redundancy checking algorithm to calculate a checksum value for the retrieved bit map segment.

5. The method of claim 1, wherein the comparing step comprises:

identifying a memory location associated with the retrieved bit map segment;

retrieving a stored status characteristic for the bit map segment from the identified memory location;

comparing the stored status characteristic with the current status characteristic; and responsive to the stored and current status characteristics being different, writing the current status characteristic to the memory location and setting an update flag.

6. The method of claim 5, wherein the transferring step comprises:

checking the update flag in the memory location associated with the bit map segment; and responsive to the update flag being set, resetting the update flag and identifying the bit map segment to a communication module for transfer to the remote computer.

7. The method of claim 1, wherein the retrieving, calculating, and comparing steps are implemented by a first subprocess and the transferring step is implemented as a second subprocess that is independent of the first subprocess.

8. A system for generating on a display of a remote computer a video image produced on a display of a host computer, the host computer being accessed by the remote computer through a remote control program the host computer including a graphics driver interface (GDI) for converting device-independent function calls into device-dependent function calls suitable for the display hardware of the host computer, the system comprising:

a scanning display driver coupled to the GDI for accessing through device-independent function calls a plurality of device-independent bit map segments generated by the host computer, for scanning the device-independent bit map segments in order to determine which segments have been changed by the host computer, and for generating a status characteristic for the device-independent bit map segments;

a memory location coupled to the scanning display driver for storing the status characteristics of the device-independent bit map segments;

a communication module coupled to the scanning display driver for transferring device-independent bit map segments to the remote computer and for receiving commands from the remote computer; and an update module coupled to the memory location and the communication module for scanning the status characteristics of the device-independent bit map segments and identifying selected bit map segments to the communication module for transferring to the remote computer.

9. The system of claim 8, wherein the scanning display driver comprises:

a scanning module for scanning each bit map segment retrieved through a device-independent function call to the GDI and calculating a characteristic of the retrieved bit map segment; and a comparison module for comparing a stored characteristic of the retrieved bit map with the calculated characteristic.

10. The system of claim 9, wherein the remote control program further comprises a communication module coupled to the comparison module and the remote computer, for transferring a retrieved bit map segment to the remote computer responsive to the stored and calculated characteristics of the bit map segment being unequal.

11. The system of claim 10, wherein the characteristic of the bit map segment is a checksum.

12. The system of claim 8, wherein the device-independent bit map segments are changed by the host computer responsive to at least one command received from the remote computer.

* * * * *